United States Patent [19]

Best et al.

[11] Patent Number: 4,547,824
[45] Date of Patent: Oct. 15, 1985

[54] DUAL BIASING FOR INTEGRATED INDUCTIVE MR HEAD

[75] Inventors: John S. Best, San Jose; Kenneth Lee, Saratoga; Ching H. Tsang, Sunnyvale, all of Calif.

[73] Assignee: International Business Machines Corporation, Armonk, N.Y.

[21] Appl. No.: 450,622

[22] Filed: Dec. 17, 1982

[51] Int. Cl.$^4$ ............................ G11B 5/12; G11B 5/30
[52] U.S. Cl. ...................................................... 360/113
[58] Field of Search .......................................... 360/113

[56] References Cited

U.S. PATENT DOCUMENTS 4,255,772  3/1981  Perez .................................... 360/113

FOREIGN PATENT DOCUMENTS 56-114121  9/1981  Japan .................................... 360/113

OTHER PUBLICATIONS

IBM TDB, vol. 24, #4, Sep. 1981, p. 1933; "Magnetoresistive Head", K. Lee & C. Tsang.

Primary Examiner—A. J. Heinz
Attorney, Agent, or Firm—R. C. Cummins; Otto Schmid, Jr.

[57] ABSTRACT

A dual element magnetic transducer in which the thin film MR read element is transversely biased by flux in the air gap of the inductive write core generated by a bias current supplied to the write winding. Flux in the air gap biases the MR element because different integral portions of the MR element have a different spatial relationship to parallel opposing portions of the inductive core. The flux which would normally pass through the gap substantially normal to the sides of the core defining the gap now tends to follow the MR element along a direction normal or transverse to the media to a point where the distance between the MR element and the core is smaller than where it entered. By appropriate control of the bias current and the spatial relationships, a relatively efficient, simple to manufacture dual element magnetic transducer is provided.

7 Claims, 4 Drawing Figures

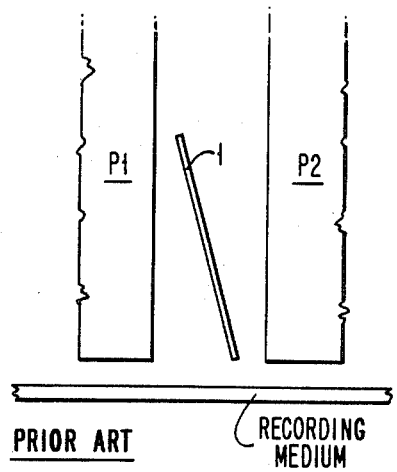
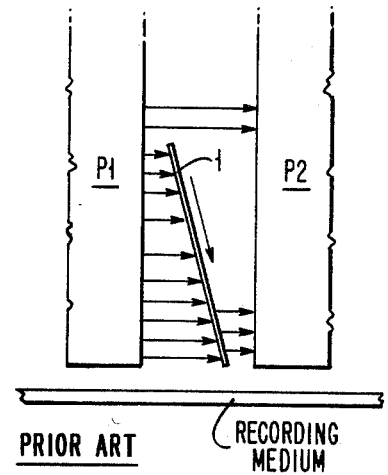
FIG. 1 (PRIOR ART)
FIG. 1A (PRIOR ART)
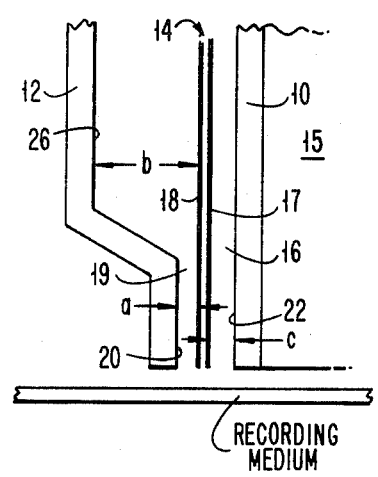
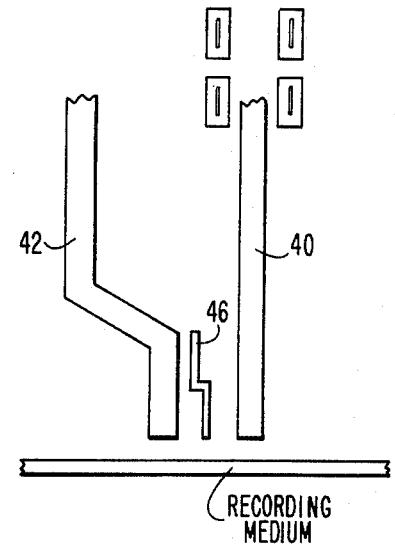
FIG. 2
FIG. 3

DUAL BIASING FOR INTEGRATED INDUCTIVE MR HEAD

BACKGROUND OF THE INVENTION

1. Field of Invention

This invention relates in general to magnetic transducers for transferring information signals to and from a magnetic medium and, in particular, to an improved dual element read/write transducer.

2. Description of the Prior Art

Various types of magnetic transducers have been disclosed in the prior art for transferring data to and from magnetic storage media such as magnetic tapes, disks and drums. One type, referred to as an inductive read/write head, employs a core of magnetic material having an air gap which is positioned adjacent to the surface of the magnetic media. A coil is wound on the core so that by supplying current to the coil, flux flows around the core and across the air gap, subjecting the magnetic surface to a flux field. By providing relative movement between the air gap and the surface and reversing current direction, the surface is magnetized horizontally in one of two directions. The area where the direction changes is referred to as a magnetic transition. The transitions correspond to reversals of current in the coil and may represent binary data values.

In order to read flux transitions from a magnetic surface, relative movement is required between the surface and the air gap of the magnetic core so that a current corresponding to the rate of change of the flux in the core is induced in a coil wound on the core. A combined inductive read/write transducer is generally used since the functions are mutually exclusive and, hence, only one core is required.

The art recognizes many drawbacks of inductive heads in attempting to read data from a magnetic surface. The linear track density of modern day recording systems is, in fact, limited primarily by the ability to read the magnetic transitions and not in the ability of the transducer to record the data.

The prior art also discloses a magnetic transducer referred to as a magnetoresistive (MR) sensor or head which has been shown to be capable of reading data from a magnetic surface at linear densities much greater than can be achieved with an inductive read head. The MR sensor operates on the principle that the resistance of the read element is a function of the amount and direction of magnetic flux being sensed by the element. The art has, therefore, suggested and disclosed several magnetic transducers in which the inductive write element is provided in combination with an MR read element. The art further teaches that in order for an MR element to operate optimally, two bias fields should be provided. In order to bias the material so that its response to a flux field is linear, a transverse bias field is generally provided. This bias field is normal to the plane of the magnetic media and parallel to the surface of the planar MR element and, in practice, has been generated by various arrangements including simple permanent magnets or complex electromagnet type devices.

The other bias field sometimes employed with MR sensors is referred to in the art as the longitudinal bias field which extends parallel to the surface of the magnetic media and parallel to the lengthwise direction of the MR sensor. The longitudinal bias field may be applied by a permanent magnet or by a mechanism referred to in the art as an "exchanged coupling" which involves the interaction of the MR element per se with a parallel element supplied with the bias current. The function of the longitudinal bias field is to suppress Barkhausen noise.

The interest in dual element inductive-write, MR-read transducers has increased in recent years because of advances in thin film technology and the ability to make integrated magnetic heads in a manner similar to making integrated circuit chips. One such dual element transducer is shown in U.S. Pat. No. 3,975,772 in which the MR element is positioned between the legs of an inductive write transducer and one shield of a pair of shields is disposed between each leg and the MR element. This patent does not disclose either form of biasing of the MR element.

A means for transverse biasing the MR element of a dual element read/write transducer is shown in IBM Technical Disclosure Bulletin, Vol. 24, No. 4, Sept. 1981 by Lee and Tsang. In the drawing of that publication, which is reproduced as FIG. 1 in this application, the MR element is positioned in the air gap of the inductive write core that is defined by the two pole tips P1 and P2. The MR element 1 is canted relative to the gap defining surfaces of the pole tips so that the upper edge of the MR element is closer to the surface of the P1 pole tip than to the P2 pole tip, while the lower edge of the MR element is closer to P2 pole tip than to P1 pole tip. As a result of this canting and of the better permeability of the material of the MR element layer relative to air, the flux in the gap which would normally extend in a uniform manner across the gap between P1 and P2 tends to enter the M1 element at the top and flow through the element toward its lower edge. FIG. 1a shows field distribution of the element shown in FIG. 1. The flux which flows from P1 to P2 through the MR element during a read operation is sufficient to provide the transverse bias field for the MR element without affecting the data stored on the surface of the medium.

If the arrangement suggested in the referenced Technical Disclosure Bulletin is implemented in integrated thin film technology, the canting of the MR element involves laying down a thin film layer of air material at an angle relative to the rest of the films in the device, which are generally in parallel planes relative to each other. The added controls for establishing the canted layer eliminates much of the advantages originally obtained from using thin film technology in making dual element transducers.

The present invention discloses an arrangement in which the transverse bias field for the MR element disposed in the gap of an inductive write core may be obtained which avoids the thin film process problems involved in laying down a layer which is canted relative to the rest of the structure. In addition, this invention discloses a specific dual biasing scheme in which Barkhausen noise is suppressed via the exchange coupled longitudinal bias and a linear, sensitive MR response is achieved via a small current in the inductive write element which is applied during reading.

SUMMARY OF THE INVENTION

In accordance with the present invention, an integrated thin film dual element read/write head is provided in which the MR element is positioned in the air gap of the core provided for the inductive write function. The MR element is transversely biased during a read operation by flux flowing through the air gap that is generated in the core by a bias current supplied to the write winding. This position of the MR layer relative to the layers which define the pole tips of the write core is such that the lower planar portion of the MR element layer is spaced between the two pole tips with all three layers being parallel, while the upper planar portion of the MR element is closer to one pole tip surface than to the other pole tip surface. The three layers are parallel to each other except that a center portion of either the MR layer or one core leg is not parallel which permits that layer to be at two different levels. Since the upper portion of the MR layer has one spatial relationship with the pole tips which is different than the spatial relationship of the lower portion of the MR layer and the corresponding pole tips, the flux which passes through the air gap has a tendency to flow transversely through the MR layer from the upper edge to the lower edge because of the relative differences in permeability between the MR element material and the air and the different spatial relationships.

The foregoing and other objects, features and advantages of the invention will be apparent from the following more particular description of a preferred embodiment of the invention as illustrated in the accompanying drawing.

BRIEF DESCRIPTION OF THE DRAWING

FIG. 1 illustrates a prior art dual element integrated read/write transducer;

FIG. 1a illustrates the magnetoresistive transverse bias mechanism for the transducer shown in FIG. 1;

FIG. 2 illustrates a dual element integrated read/write transducer embodying the present invention;

FIG. 3 illustrates a modification of the transducer shown in FIG. 2.

DESCRIPTION OF THE PREFERRED EMBODIMENT

One embodiment of the invention is illustrated in FIG. 2 which represents a portion of a dual element transducer that is constructed in accordance with an integrated or thin film manufacturing process. Since the three relevant layers are substantially parallel to each other, there are no unique process steps nor special manufacturing equipment involved in the manufacture of the transducer shown in FIG. 2.

The layers 10 and 12 comprise the legs of the inductive write core, while the MR element is represented by layer 14. As shown, layer 10 would be deposited first on a substrate 15. A layer of suitable insulating material 16 is then provided, followed by the layer of nickel iron, commonly referred to as permalloy, magnetoresistive material 17 and the exchange bias layer 18 of iron manganese, as is well known in the art. Another layer of insulating material 19 is next deposited on the exchange bias layer in a manner to permit the layer 12 representing the top leg of the inductive core to be deposited at two distinct levels. The thickness of insulating layer 19 adjacent the lower half of the MR leg 14 is considerably less than the thickness of the insulating layer adjacent the upper portion of the MR element. The distance "a" between gap defining surface 20 of pole tip 12 and the MR element 14 is substantially different than the distance "b" between the surface 26 of leg 12 and the MR element 14. On the other hand, the distance "c" between MR element 14 and surface 22 of the other pole tip 10 is substantially the same for the entire height of the MR element 14. As a result of the different spatial relationships of the upper and lower portions of the MR element relative to legs 10 and 12 of the inductive core, the flux field between legs 10 and 12 has a tendency, at the appropriate bias current level, to flow in the upper portion of the MR element toward the lower portion which results in a transverse bias field for the MR element when a suitable bias current is supplied to the write winding during the read operation.

FIG. 3 illustrates an integrated thin film MR transducer which is functionally similar to the arrangement shown in FIG. 1 but involves a somewhat different geometry of the related layers. As shown in FIG. 3, the layers 40 and 42 representing the legs of the inductive write core and the pole tips that define the write gap are each disposed in a single layer and are parallel to each other. The MR element 46, however, is disposed in two separate layers, each of which is parallel to the layers of the core so as to create a spatial relationship between the lower portion of the MR element and the legs 40 and 42 which is different than the spatial relationship of the upper portion of the MR element and the legs 40 and 42. As in FIG. 2, when a suitable bias current is applied to the write coil of the transducer shown in FIG. 3, some of the flux flowing through the air gap will flow through the MR element in a direction transverse to or normal to the storage medium, thereby creating the transverse bias field for the MR element.

The specific steps for laying down the various layers of the thin film transducer have not been discussed in detail in that any of the prior art thin film processes may be employed. Similarly, the specific materials have not been disclosed since any of the materials known in the prior art for dual element magnetic transducers may be employed.

While the invention has been particularly shown and described with reference to a preferred embodiment thereof, it will be understood by those skilled in the art that various changes in the form and details may be made therein without departing from the spirit and scope of the invention. For example, there are a number of different geometries available for the three elements involving substantially planar layers (except for the bridging portion) which will achieve different spatial relationships between upper and lower portions of the MR element and the inductive core legs.

Having thus described our invention, what we claim as new and desire to secure by Letters Patent is:

1. A dual element magnetic transducer comprising an inductive write element and an integral MR read element, said write element comprising a magnetic core including first and second pole tips defining an air gap adapted to be disposed in flux transmitting relationship with the surface of a magnetic storage medium, a coil disposed on said core adapted to be energized by a write current when said transducer is writing data to said storage medium and a bias current when said transducer is reading data from said storage medium, said MR element being disposed in said air gap with one planar portion having a first spatial relationship relative to said pole tips and another planar portion thereof having a second spatial relationship with said pole tips wherein at least one of said planar portions is subtantially parallel to at least one of said pole tips whereby said first and second spatial relationships cause a portion of the flux in said gap generated by said bias current to flow from one of said pole tips through said planar portions of said MR element in a direction normal to the surface of said medium to said other pole tip to establish a transverse bias field for said MR element during said read operation.

2. The transducer recited in claim 1 in which said magnetic core includes a pair of leg members disposed in spaced parallel relationship to each other with the distal end of each said leg member corresponding to one of said pole tips and said planar portions of said MR element are disposed in different planes parallel to said leg members and are joined together by a bridging member to form an integral MR element.

3. The transducer recited in claim 1 in which said magnetic core includes a pair of leg members disposed in spaced parallel relationship to each other with the distal end of each said leg member corresponding to one of said pole tips, the spacing between said pole tips defining portions of said leg members being different than the spacing between the adjacent portion of said leg members to create said difference in said spatial relationship of said portions of said MR element to said core.

4. The transducer recited in claim 2 in which said elements and said coil are integrated as a multilayer thin film transducer.

5. The transducer recited in claim 3 in which said elements and said coil are integrated as a multilayer thin film transducer.

6. The transducer recited in claim 4 in which one leg of said core is deposited on a planar surface of a substrate.

7. The transducer recited in claim 6 in which the MR element includes a layer of permalloy material and an adjacent layer of iron manganese material to permit biasing of said permalloy material by flux from said core.

* * * * *